US012712872B2

(12) United States Patent
Ding et al.

(10) Patent No.: US 12,712,872 B2
(45) Date of Patent: Aug. 18, 2026

(54) AUTHENTICATION PROCEDURES BETWEEN NETWORK DEVICES AND CLIENTS

(71) Applicant: HEWLETT PACKARD ENTERPRISE DEVELOPMENT LP, Spring, TX (US)

(72) Inventors: Feng Ding, Beijing (CN); Hao Lu, Fremont, CA (US); Youhe Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 302 days.

(21) Appl. No.: 18/516,180

(22) Filed: Nov. 21, 2023

(65) Prior Publication Data

US 2025/0168157 A1 May 22, 2025

(51) Int. Cl.
*H04L 29/06* (2006.01)
*H04L 9/40* (2022.01)

(52) U.S. Cl.
CPC ...... *H04L 63/0823* (2013.01); *H04L 63/0853* (2013.01)

(58) Field of Classification Search
CPC ........................ H04L 63/0823; H04L 63/0853
See application file for complete search history.

(56) References Cited

U.S. PATENT DOCUMENTS 11,316,701 B1 * 4/2022 Perez .................... H04L 9/3247
11,496,455 B2 * 11/2022 Patton .................. H04L 63/045
11,563,590 B1 * 1/2023 Bowen .................. H04L 9/3247
12,101,417 B1 * 9/2024 Slaughter ................ H04L 9/321
12,388,663 B2 * 8/2025 Hebbalamath ........ H04L 9/3268
2013/0339740 A1 * 12/2013 Ben-Shalom ....... H04L 63/0876
713/175
2017/0034284 A1 * 2/2017 Smith .................. H04L 9/0825
2017/0093587 A1 * 3/2017 Glisson ................ H04L 63/062
2019/0297073 A1 * 9/2019 Rossi .................. H04L 63/0823
2020/0067915 A1 * 2/2020 Kumar .................. H04L 9/0637
2021/0266185 A1 * 8/2021 Konda ................ H04L 61/4511
(Continued)

OTHER PUBLICATIONS

Nathanael A Thompson et al., Extended Abstract: Authentication on the Edge-Distributed Authentication for a Global Open Wi-Fi Network, Sep. 9, 2007, ACM, pp. 334-337. (Year: 2007).*
(Continued)

*Primary Examiner* — Luu T Pham
*Assistant Examiner* — Fahimeh Mohammadi
(74) *Attorney, Agent, or Firm* — Trop, Pruner & Hu, P.C.

(57) ABSTRACT

In some examples, a network device receives, from an orchestration server, a name for use in obtaining a certificate. The network device sends, to a certificate enrollment server, a certificate request comprising the name, and receives, from the certificate enrollment server, a response to the certificate request, the response including information of the certificate that is based on the name in the certificate request. The network device detects that an authentication server is unavailable for an authentication procedure for a client coupled to the network device. Based on detecting that the authentication server is unavailable, the network device uses the certificate based on the name in the certificate request as part of the authentication procedure between the network device and the client.

18 Claims, 5 Drawing Sheets

(56) References Cited

U.S. PATENT DOCUMENTS

| | | | | |
|---|---|---|---|---|
| 2021/0328973 | A1* | 10/2021 | Sarkissian | H04L 63/123 |
| 2022/0070002 | A1* | 3/2022 | Turner | H04L 9/3247 |
| 2022/0210146 | A1* | 6/2022 | Dhanabalan | H04L 63/1483 |
| 2022/0358494 | A1* | 11/2022 | Ramadhane | H04L 63/0846 |
| 2025/0240175 | A1* | 7/2025 | Evans | H04L 9/3263 |

OTHER PUBLICATIONS

John Burgess et al., Surviving Attacks on Disruption-Tolerant Networks without Authentication, Sep. 9, 2007, ACM, pp. 61-70. (Year: 2007).*

Hokeun Kim et al., Authentication and Authorization for the Internet of Things, Oct. 4, 2017, IEEE, vol. 19, Issue: 5, pp. 27-33. (Year: 2017).*

Li Gong, Increasing Availability and Security of an Authentication Service, Jun. 1993, IEEE, vol. 11, Issue: 5, pp. 657-662. (Year: 1993).*

Arubanetworks, "Understanding 802.1X Authentication", available online at <https://www.arubanetworks.com/techdocs/ArubaOS_83_Web_Help/Content/ArubaFrameStyles/802.1x/underst_802_1x_auth.htm>, 2018, 2 pages.

Cisco, "Upload Custom Certificate in Cisco Business Wireless Access Point", Sep. 2, 2021, available online at <https://www.cisco.com/c/en/us/support/docs/smb/wireless/CB-Wireless-Mesh/kmgmt3145-upload-custom-certificate-cbw.html>, 5 pages.

Digicert, "What is a Common Name (CN)?", available online at <https://knowledge.digicert.com/solution/what-is-a-common-name>, Nov. 1, 2023, 3 pages.

Nottingham et al., "Defining Well-Known Uniform Resource Identifiers (URIs)", Internet Engineering Task Force (IETF), Request for Comments: 5785, Apr. 2010, 8 pages.

Pritikin et al., "Enrollment over Secure Transport", Internet Engineering Task Force (IETF), Request for Comments: 7030 , Oct. 2013, 53 pages.

SecureW2?, "Simplifying WPA2-Enterprise and 802.1x", Apr. 5, 2023, available online at <https://web.archive.org/web/20230405112945/https://www.securew2.com/solutions/wpa2-enterprise-and-802-1x-simplified>, 21 pages.

Simon et al., "The EAP-TLS Authentication Protocol", Network Working Group, Request for Comments: 5216, Mar. 2008, 34 pages.

SSLs.com, "How to make sure domain is correct in the CSR?", available online at <https://www.ssls.com/knowledgebase/how-to-make-sure-domain-is-correct-in-the-csr/>, Jul. 9, 2019, 6 pages.

Wikipedia, "IEEE 802.1X", available online at <https://en.wikipedia.org/w/index.php?title=IEEE_802.1X&oldid=1126604830>, Dec. 10, 2022, 9 pages.

Wikipedia, "RADIUS", available online at https://en.wikipedia.org/w/index.php?title=RADIUS&oldid=1170128963>, Aug. 13, 2023, 17 pages.

Wikipedia, "Subject Alternative Name", available online at <https://en.wikipedia.org/w/index.php?title=Subject_Alternative_Name&oldid=1157664716>, May 30, 2023, 2 pages.

Wikipedia, "X.509", available online at <https://en.wikipedia.org/w/index.php?title=X.509&oldid=1180963505>, Oct. 19, 2023, 17 pages.

* cited by examiner

AUTHENTICATION PROCEDURES BETWEEN NETWORK DEVICES AND CLIENTS

BACKGROUND

Electronic devices are able to communicate over networks, which can include wireless networks or wired networks. A network can include network devices to which an electronic device can associate to gain access to the network.

BRIEF DESCRIPTION OF THE DRAWINGS

Some implementations of the present disclosure are described with respect to the following figures.

Figure 1:
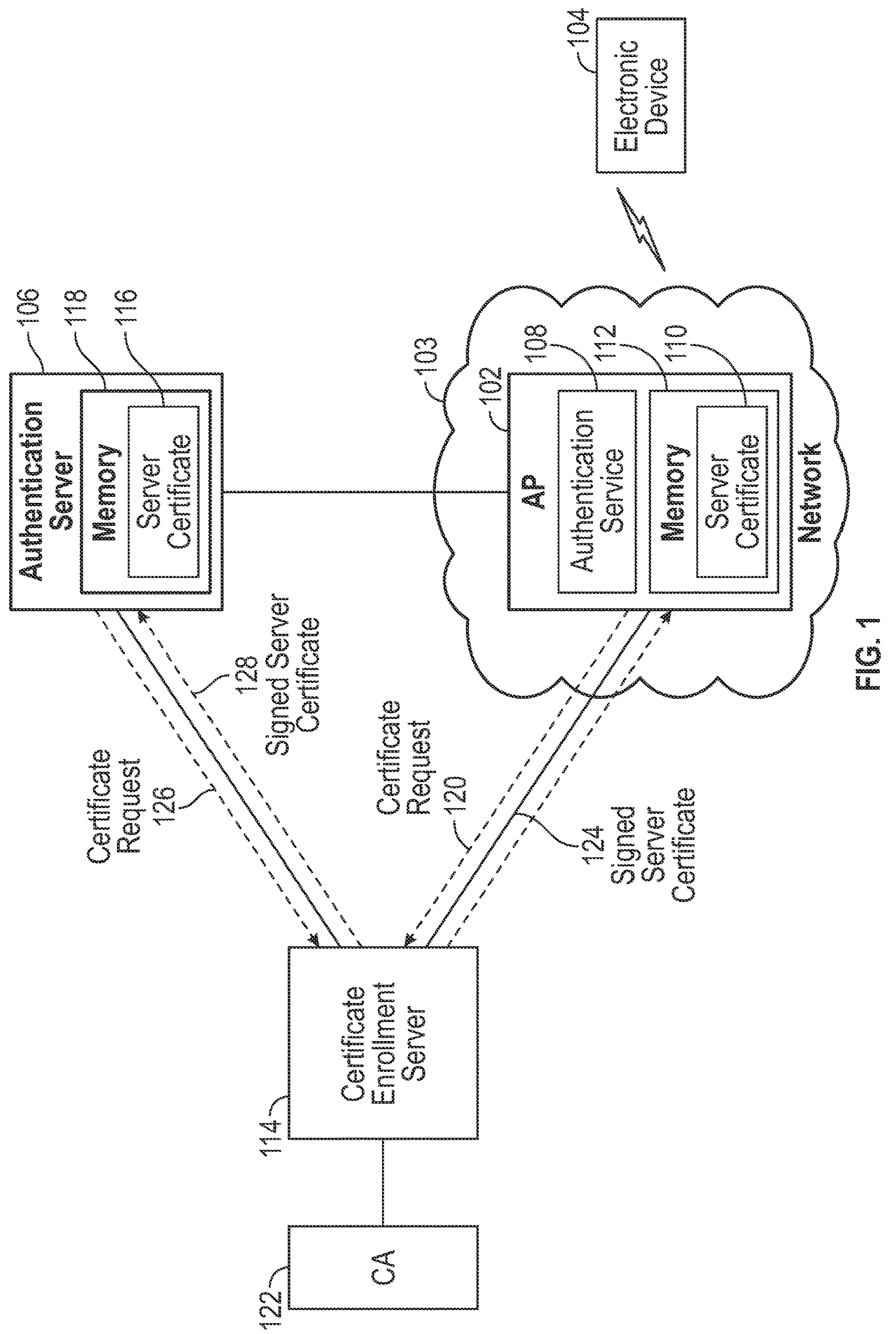
FIG. 1 is a block diagram of a network arrangement including an access point (AP) that is able to support authentication survivability, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An electronic device is able to gain access to a network by associating with a network device. In some examples, a network device may be a wireless access point (AP) with which the electronic device is able to establish wireless connectivity. In other examples, a network device may include a switch (a layer 2 switch or a layer 3 router) that the electronic device can connect to using a wired connection. Before the electronic device is granted access to resources of the network, an authentication procedure is performed between the electronic device and an authentication server. After the electronic device has been successfully authenticated by the authentication server, the electronic device is granted access to the resources of the network.

Authentication survivability refers to the ability to provide network connectivity to electronic devices even if an authentication server is unavailable. For example, the authentication server may become unavailable due to a fault (e.g., hardware fault, fault in machine-readable instructions such as software or firmware, or other faults) at the authentication server. As another example, the authentication server may become unavailable due to loss of a network connection to the authentication server. If electronic devices are unable to connect to a network or remain connected to the network when the authentication server becomes unavailable, then users are prevented from accessing resources of the network using the electronic devices. Additionally, loss of network connectivity would lead to interruptions in operations of the electronic devices over the network.

Authentication survivability may be achieved by configuring network devices (such as wireless APs, switches, or other network devices) with authentication server functionality so that the network devices can perform authentication procedures with electronic devices that are coupled to the network devices when an authentication server becomes unavailable. An electronic device can determine whether to trust a network device based on a server certificate, such as a Remote Authentication Dial-In User Service (RADIUS) server certificate, at the network device. In some cases, users (such as network administrators) may manually upload a server certificate and a private key that have been used by an authentication server to network devices so that the network devices can provide the server certificate to electronic devices to enable the electronic devices to verify the trustworthiness of the network devices. However, if any network device is compromised (e.g., infected by malware, hacked by an authorized user, etc.), then the security of all network devices and the authentication server may become compromised due to the exposure of the security certificate and private key at the compromised network device.

In other examples, a user may manually upload dedicated server certificates to different network devices (i.e., each network device is provided with a corresponding different server certificate). In this way, even if one network device becomes compromised, the other network devices and the authentication server are not compromised since they use different dedicated server certificates. However, having to manually upload dedicated server certificates to network devices is time consuming and error prone. Additionally, the manual communication of server certificates may occur over insecure communication channels, which may allow an attacker (e.g., a malware program, a compromised machine, a user, or another entity) to gain unauthorized access to the server certificates.

In accordance with some implementations of the present disclosure, a certificate enrollment server is used to automatically provision server certificates to network devices to which electronic devices are coupled (over a wireless or wired connection), so that the network devices can support authentication survivability in case of unavailability of an authentication server. The server certificates provided to network devices of different network providers are different from one another. As a result, even if one network device were to be compromised, the server certificates of the other network devices remain unexposed and the other network devices can continue to operate safely. For a given network provider (e.g., Company X) that operates a network device, a name for the given network provider can be provided to both the authentication server and the network device. The authentication server can send a first certificate request including the name to the certificate enrollment server, such as an Enrollment over Secure Transport protocol (EST) server. In response, the certificate enrollment server provides a server certificate to the authentication server based on the name in the first certificate request. The network device can send a second certificate request including the same name to the certificate enrollment server, and in response, the certificate enrollment server provides a server certificate to the network device based on the name in the second certificate request. If the authentication server were to become unavailable, the network device can take over to provide authentication services to an electronic device coupled to the network device. In an authentication procedure, the network device provides, to the electronic device, the server certificate received from the certificate enrollment server. Since the server certificate received from the certificate enrollment server is based on the name for the network provider of the network device, the electronic device can establish a trust relationship with the network device.

A "certificate" can refer to digital information, which can be in the form of a file or another type of object, that contains information such as the identity of an entity that is to be authenticated based on the certificate. A "server certificate" can refer to a certificate of a server that a client can use to authenticate the server. In the context of a network, the server certificate can be used by clients to authenticate a network device (i.e., determine that the network device can be trusted by the clients). As noted above, examples of network devices can include a wireless AP, a switch, or any other type of network device.

FIG. 1 is a block diagram of an example network arrangement that includes a wireless AP 102 with which an electronic device 104 can associate to allow the electronic device 104 to access a network 103 that contains the AP 102. Examples of the electronic device 104 can include any or some combination of the following: a computer (a desktop computer, a notebook computer, a tablet computer, a server computer, etc.), a smartphone, a game appliance, an Internet of Things (IoT) device, a vehicle, a household appliance, or any other type of electronic device. Before the electronic device 104 associates with the AP 102, the electronic device 104 first performs an authentication procedure to authenticate the electronic device 104.

The network 103 can include a wireless network such as a wireless local area network (WLAN). A WLAN can include one or more APs having respective coverage areas with which electronic devices are able to establish wireless connectivity. In other examples, the network 103 can include a cellular network, and the AP 102 can be a base station of the cellular network.

In other examples, the network 103 can be a wired network with one or more network devices (e.g., switches) with which electronic devices can associate to gain access to the wired network.

The network arrangement further includes an authentication server 106 with which clients are able to perform authentication procedures to allow the clients to gain access to a target resource, such as the network 103. In some examples, the authentication server 106 is a Remote Authentication Dial-In User Service (RADIUS) server. RADIUS refers to a networking protocol that provides authentication, authorization, and accounting (AAA) management for clients.

In some examples, the authentication procedure performed between a client and the authentication server 106 is according to the Extensible Authentication Protocol-Transport Layer Security (EAP-TLS) protocol, which is described in Request for Comments (RFC) 5216, entitled "The EAP-TLS Authentication Protocol," dated March 2008. The authentication procedure according to EAP-TLS can be an Institute of Electrical and Electronic Engineers (IEEE) 802.1X authentication procedure. The EAP-TLS protocol used in the IEEE 802.1X authentication procedure allows a client and the authentication server 106 to use their respective certificates to verify their identities to each other and perform mutual authentication. The certificates used can be X.509 certificates, including a server certificate and a client certificate. X.509 is an International Telecommunication Union (ITU) standard that defines the format of public key certificates. such as the server certificate 110.

Although reference is made to specific protocols or standards in the present discussion, it is noted that other protocols or standards can be used in other examples, such as protocols or standards relating to authentication, obtaining or generating certificates, or other activities. A "protocol" can refer to a standardized protocol, an open-source protocol, or a proprietary protocol.

A "client" can refer to an electronic device, such as the electronic device 104, or a program in an electronic device. A "server" can refer to a computing platform including one or more computers. A server can be accessed by a client to provide a requested operation, such as to perform authentication to gain access to a target resource.

The authentication server 106 can be a remote authentication server that resides in the cloud or in any other location that is remote from a location of the AP 102. In other examples, the authentication server 106 and the AP 102 can be co-located within a physical facility, such as a building, an office, a retail location, or any other location. In examples where the authentication server 106 is a remote authentication server, the authentication server 106 can provide perform authentication procedures for clients of different customers (e.g., different companies, different organizations, different users, etc.).

As noted above, in some cases, the authentication server 106 may become unavailable due to any of various reasons. If the authentication server 106 becomes unavailable, then electronic devices, including the electronic device 104, would not be able to access a network of the AP 102 due to an inability to successfully perform an authentication procedure with the authentication server 106.

Moreover, in some cases, even if an electronic device has successfully performed an authentication procedure with the authentication server 106 to gain access to the network 103, there may be conditions under which an electronic device may have to later re-authenticate with the authentication server 106 to maintain connectivity with the network 103. If the authentication server 106 were to become unavailable when the electronic device attempts the re-authentication, the electronic device may lose connectivity to the network 103 due to the inability to perform the re-authentication.

Examples of triggers for re-authentication can include a time-based trigger, a roaming-based trigger, a power transition trigger, or any other trigger. The time-based trigger can be a trigger based on expiration of a time interval. After an expiration of the time interval from when an electronic device last successfully performed an authentication procedure, the electronic device would be triggered to perform a re-authentication with the authentication server 106.

The roaming-based trigger can be a trigger responsive to roaming of an electronic device between different APs. When the electronic device moves between coverage areas of different APs, the electronic device can lose its connection to a first AP and establish a connection with a second AP. Under certain conditions, the electronic device may have to perform re-authentication with the authentication server 106 due to such roaming.

The power transition trigger can be a trigger caused by the electronic device transitioning from a lower power state (e.g., a sleep state, a hibernation state, power off state, or any other lower power state) to an operational state in which the electronic device executes machine-readable instructions such as an operating system (OS), an application program, or other machine-readable instructions. When the electronic device transitions from the lower power state to the operational state, the electronic device may have to re-authenticate with the authentication server 106.

In accordance with some implementations of the present disclosure, the AP 102 includes an authentication service 108 to support authentication survivability in case the authentication server 106 were to become unavailable. A "service" can refer to machine-readable instructions executed on a computing platform, such as the AP 102 or any other computing platform. In some examples, the authentication service 108 is a RADIUS service or any other type of authentication service that can perform an authentication procedure with a client, such as an EAP-TLS authentication procedure.

The authentication procedure can involve the electronic device 104 and the authentication service 108 verifying identities of one another using respective certificates of the electronic device 104 and the AP 102. The certificate of the electronic device 104 is a client certificate, while the certificate of the AP 102 is a server certificate 110. The electronic device 104 provides the client certificate to the authentication service 108 to allow the authentication service 108 to verify the identity of the electronic device 104, and the authentication service 108 provides the server certificate 110 to the electronic device 104 to allow the electronic device 104 to verify the identity of the AP 102.

The server certificate 110 is stored in a memory 112 of the AP 102. The memory 112 can be implemented using one or more memory devices. Examples of memory devices can include any or some combination of the following: a dynamic random access memory (DRAM) device, a static random access memory (SRAM) device, a flash memory device, or any other type of memory device.

In some examples, the memory 112 is a secure memory, such as the secure memory of a Trusted Platform Module (TPM), which is a type of a secure cryptoprocessor that generates cryptographic keys. More generally, the secure memory can be any memory in the AP 102 protected against unauthorized access.

The AP 102 can obtain the server certificate 110 from a certificate enrollment server 114. In some examples, the certificate enrollment server 114 operates according to the Enrollment over Secure Transport (EST) protocol, as described in RFC 7030, entitled "Enrollment over Secure Transport," dated October 2013. The EST protocol automates certificate issuance, such as issuance of an X.509 certificate, for public key infrastructure (PKI) clients, such as the electronic device 104. In the EST framework, the AP 102 is an example of an EST client, and the certificate enrollment server 114 is an example of an EST server. The EST client (the AP 102) obtains a signed server certificate from the EST server (the certificate enrollment server 114).

The authentication server 106 also obtains a server certificate 116 from the certificate enrollment server 114. The server certificate 116 is stored in a memory 118 (e.g., a secure memory) of the authentication server 106.

The AP 102 requests the certificate from the certificate enrollment server 114 by sending a certificate request 120 to the certificate enrollment server 114. In some examples, the certificate request 120 can be a certificate signing request (CSR). A CSR refers to an encoded file or message that contains information associated with the AP 102.

Examples of information contained in a CSR can include any or some combination of the following parameters:

- A public key of the AP 102 and a signature of the AP 102, where the public key and the signature can be used by the certificate enrollment server 114 to verify the identity of the AP 102. The signature of the CSR is generated based on a private key of the AP 102. The public key and private key form a cryptographic public-private key pair and are referred to as "bootstrapping certificates."
- A common name (CN) that is the primary domain of the certificate requested by the CSR. The common name can be a fully qualified domain name such as CompanyA.com (an example of a web address). In the example of FIG. 1, CompanyA is the network provider for the network 103.
- Location information regarding a location (e.g., a locality, a state, a country, etc.) of a requesting entity that is requesting the certificate.
- An organization identifier of an organization of the requesting entity.
- Other information.

Although reference is made to examples of information that can be included in a certificate request such as a CSR, in other examples, alternative or additional information can be included in a certificate request.

In addition to the CN (common name) noted above, the CSR may also contain a Subject Alternative Name (SAN) in examples where SAN is supported. The SAN can refer to additional domain(s) that is (are) in addition to the domain referred to by the CN. The additional domain(s) may be domain(s) of the network provider of the network 103, for example. In examples where a SAN is included in the CSR, a certificate generated in response to the CSR is a multi-domain certificate that is applicable to multiple domains identified by the CN and the SAN.

A "domain" identified by a domain name (e.g., the CN or SAN) refers to a collection of one or more resources (e.g., websites, services, or other resources). The term "name" as used here can refer to domain name(s) of one or more domains.

The certificate request 120 such as a CSR is issued to a certificate authority (CA), which in FIG. 1 is CA 122 that is associated with the certificate enrollment server 114. A CA is the entity that is responsible for generating a certificate based on information included in a certificate request. Note that the CA 122 can be separate from or part of the certificate enrollment server 114.

Information in the certificate request 120 is passed from the certificate enrollment server 114 to the CA 122. Based on the information in the certificate request 120, the CA 122 generates a signed server certificate for the domain(s) identified in the CN (and possibly the SAN) in the certificate request 120 (as signed by a private key of the CA 122). The certificate enrollment server 114 sends the signed server certificate 124 to the AP 102. The AP can derive the server certificate 110 from the signed server certificate 124 by decrypting the signed server certificate 124 using a cryptographic key (e.g., the public key) of the AP 102. In some examples, the process of requesting and obtaining a certificate is according to the EST protocol.

The authentication server 106 can similarly issue a certificate request 126 to the certificate enrollment server 114 to obtain the server certificate 116. The certificate request 126 from the authentication server 106 includes the same name(s) (e.g., the CN and possibly the SAN) that is included in the certificate request 120 from the AP 102. The certificate request 126 further includes parameters (e.g., public key and signature of the authentication server 106, location information, organization information, etc.) similar to those of the certificate request 120 from the AP 102. Information of the certificate request 126 is passed by the certificate enrollment server 114 to the CA 122, which generates a signed server certificate. The certificate enrollment server 114 sends the signed server certificate 128 to the authentication server 106, which derives the server certificate 116 by decrypting the signed server certificate using the public key of the authentication server 106.

The connections between the AP 102 and the certificate enrollment server 114 and between the authentication server 106 and the certificate enrollment server 114 are secure connections, such as secure tunnels. For example, a secure tunnel can include a Secure Sockets Layer (SSL) tunnel. In other examples, other types of secure connections (in which messages can be protected by signing or encrypting the messages) can be employed between the certificate enrollment server 114 and each of the AP 102 and authentication server 106.

In accordance with some implementations of the present disclosure, the same name (relating to a domain (or multiple domains) of the network provider of the network 103) is included in the certificate requests 120 and 126 issued by the AP 102 and the authentication server 106, respectively. In this way, the server certificates 110 and 116 provided by the certificate enrollment server 114 to the AP 102 and the authentication server 106, respectively, are part of the same authentication chain. More specifically, each of the server certificates 110 and 116 includes the same name of the network provider of the network 103. The client is able to trust the authentication server 106 based on the server certificate 116 including the same name, and is able to trust the authentication service 108 in the AP 102 based on the server certificate 110 including the same name.

Figure 2:
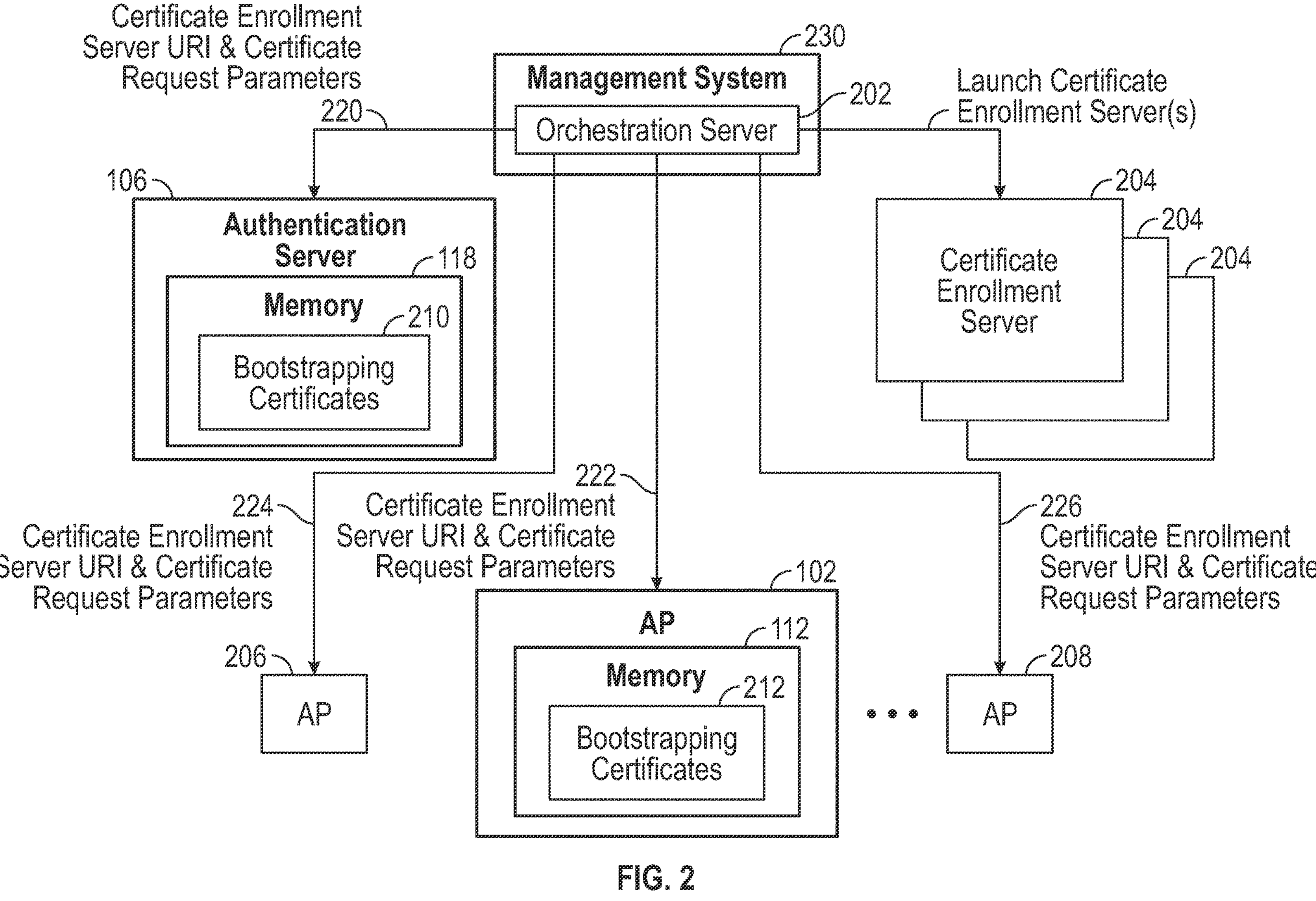
FIG. 2 is a block diagram of an arrangement including an orchestration server to support use of a certificate enrollment server, according to some examples.

FIG. 2 is a block diagram of an example arrangement that includes an orchestration server 202 that is used to launch one or more certificate enrollment servers 204 and to send information to the authentication server 106 and APs 102, 206, and 208 to enable the authentication server 106 and the APs 102, 206, and 208 to access a given certificate enrollment server of the certificate enrollment servers 204. The certificate enrollment server 114 of FIG. 1 is an example of one of the certificate enrollment servers 204.

An "orchestration server" can refer to a server that is to manage the use of a certificate enrollment server and to provide information that enables other devices to use the certificate enrollment server.

"Launching" a certificate enrollment server can refer to starting the certificate enrollment server, transitioning the certificate enrollment server from an inactive state to an active state, or otherwise enabling the certificate enrollment server to function.

In some examples, the authentication server 106 may be configured with bootstrapping certificates 210 stored in the memory 118 of the authentication server 106. The bootstrapping certificates 210 may be configured during manufacture of the authentication server 106, or at a different time. The bootstrapping certificates 210 include the public key and the private key of the authentication server 106. In some examples, the public key and the private key are elliptic curve cryptography (ECC) keys. In other examples, other types of public and private keys can be used.

Similarly, the AP 102 may be configured with bootstrapping certificates 212 stored in the memory 112 of the AP 102. The bootstrapping certificates 212 may be configured during manufacture of the AP 102, or at a different time. The other APs 206 and 208 can similarly be configured with their respective bootstrapping certificates that are stored in the memories of the APs 206 and 208.

As discussed above in connection with FIG. 1, the public and private keys of bootstrapping certificates are used by the AP 102 and the authentication server 106 when sending certificate requests to the certificate enrollment server 114.

In examples where multiple certificate enrollment servers 204 are deployed, the orchestration server 202 can provide to the authentication server 106 and the APs 102, 206, and 208 information regarding which of the certificate enrollment servers 204 to use for obtaining server certificates. For example, the certificate enrollment servers 204 may be located at different locations (e.g., different geographic regions such as cities, states, provinces, countries, etc.). The certificate enrollment server selected for an AP may be based on the location of the AP.

The information of a selected certificate enrollment server of the certificate enrollment servers 204 to use can include a uniform resource identifier (URI), for example. The orchestration server 202 can send, to each of the authentication server 106 and the APs 102, 206, and 208, the URI of a given certificate enrollment server ("certificate enrollment server URI") to use for obtaining a server certificate. In this manner, the authentication server 106 and the APs 102, 206, and 208 do not have to make an assessment of which certificate enrollment server to use.

In a specific example, a certificate enrollment server URI can have the form https://www.example.com/enrollment-service/company-x/enroll, where "company-x" can identify the network provider of the network 103, for example. In other examples, other types of information can be used to identify a certificate enrollment server.

As shown in FIG. 2, the orchestration server 202 sends (at 220) information to the authentication server 106 to enable the authentication server 106 to obtain a server certificate, where the information includes: (1) a certificate enrollment server URI that identifies a certificate enrollment server (from among the certificate enrollment servers 204) to use; and (2) certificate request parameters to include in a certificate request (e.g., 126 in FIG. 1) sent from the authentication server 106 to the certificate enrollment server identified by the certificate enrollment server URI. The certificate request parameters can be obtained by the orchestration server 202 from a database that includes information of devices (including authentication servers and APs or other network devices) added to a network arrangement.

Similarly, the orchestration server 202 sends (at 222) information to the AP 102 to enable the AP 102 to obtain a server certificate, where the information includes: (1) a certificate enrollment server URI that identifies a certificate enrollment server (from among the certificate enrollment servers 204) to use; and (2) certificate request parameters to include in a certificate request (e.g., 120 in FIG. 1) sent from the AP 102 to the certificate enrollment server identified by the certificate enrollment server URI. The orchestration server 202 also sends (at 224, 226) similar information to the other APs 206 and 208, respectively.

In some examples, if multiple APs are operated by the same customer (e.g., the network provider of the network 103 of FIG. 1), then the same certificate enrollment server URI can be provided by the orchestration server 202 to each of the multiple APs. On the other hand, if multiple APs are operated by different customers (e.g., customer 1 and customer 2), then the orchestration server 202 provides different certificate enrollment server URIs to the different APs. For example, the orchestration server 202 provides a first certificate enrollment server URI to first AP(s) operated by customer 1, and provides a different second certificate enrollment server URI to second AP(s) operated by customer 2.

The certificate request parameters included in the information sent by the orchestration server 202 to the authentication server 106 and the APs 102, 206, and 208 include a name (the CN and possibly the SAN) of domain(s) to include in the respective certificate request sent to the certificate enrollment server.

In some examples, the orchestration server 202 is part of a management system 230. A customer, such as the network provider of the network 103 of FIG. 1, may access the management system 230, such as by logging in the management system 230, to provide a configuration of a certificate enrollment server. The configuration of the certificate enrollment server may include any or some combination of the following: a domain name for the certificate enrollment server URI, a retention time of a signed certificate, and so forth. The customer may also upload a CA, which can be used as the CA 122 of FIG. 1, for example. The CA uploaded by the customer is the CA to be used in generating a server certificate in response to a certificate request. The orchestration server 202 can launch one or more certificate enrollment servers 204 based on the configuration, and the uploaded CA is deployed for generating certificates in response to certificate requests.

Figure 3:
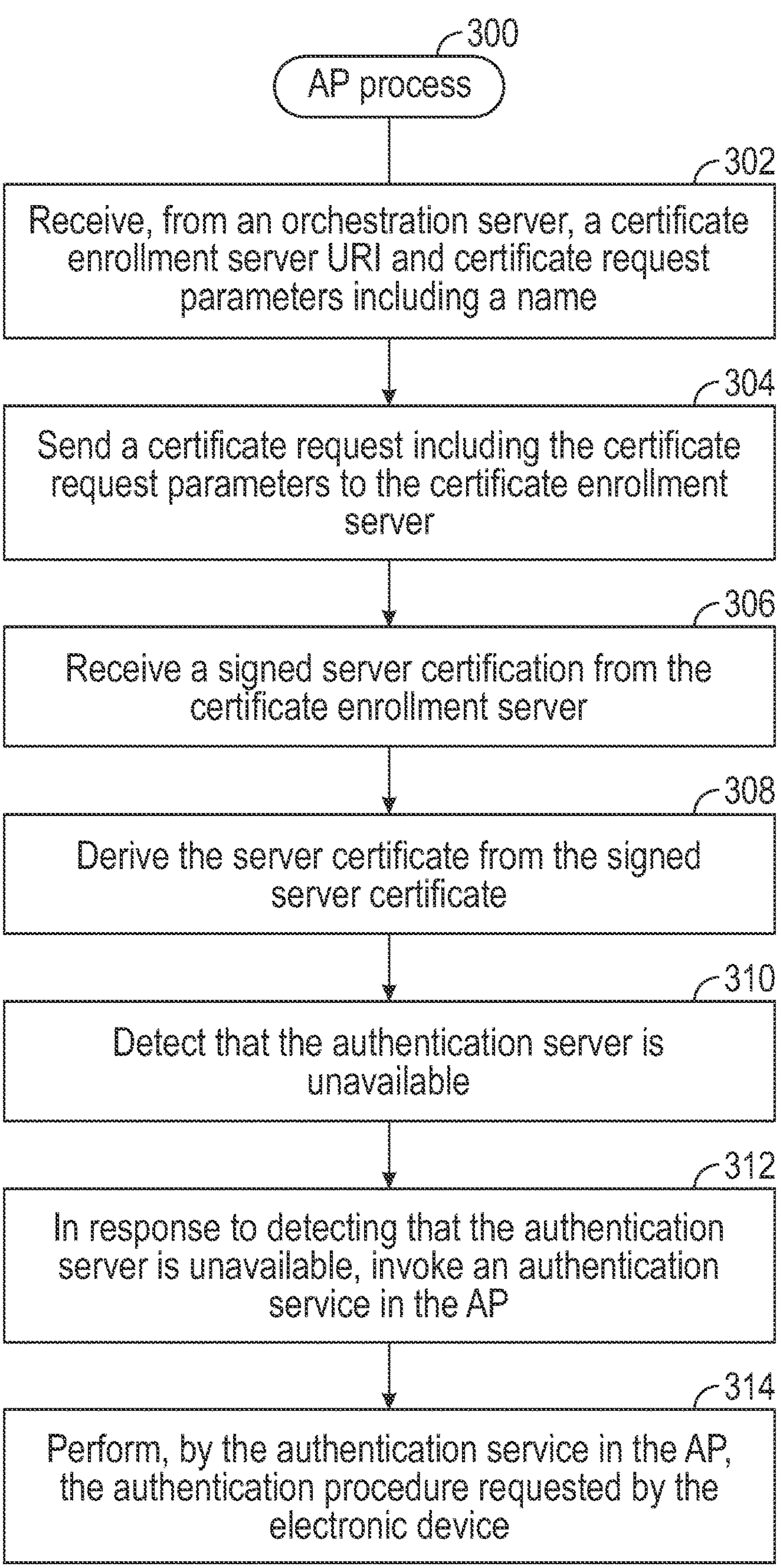
FIG. 3 is a flow diagram of a process performed by an AP, according to some examples.

FIG. 3 is a flow diagram of a process 300 performed by the AP 102 according to some examples. The AP 102 receives (at 302), from the orchestration server 202, a certificate enrollment server URI identifying a certificate enrollment server, and certificate request parameters including a name of domain(s) of a network provider associated with the AP 102.

To obtain a server certificate from the certificate enrollment server identified by the received certificate enrollment server URI, the AP sends (at 304) a certificate request including the certificate request parameters to the certificate enrollment server (e.g., 114 in FIG. 1) identified by the received certificate enrollment server URI. The CA (e.g., 122 in FIG. 1) associated with the identified certificate enrollment server generates a signed server certificate. The AP 102 receives (at 206) the signed server certificate (e.g., 124 in FIG. 1) from the certificate enrollment server. The AP 102 derives (at 308) the server certificate (e.g., 110 in FIG. 1) from the signed server certificate.

When the authentication server 106 is available, any client, such as the electronic device 104 in FIG. 1, that desires to access the network 103 would first perform an authentication procedure with the authentication server 106. The authentication procedure involves an exchange of messages (e.g., RADIUS messages) that are passed through the AP 102 between the electronic device 104 and the authentication server 106.

However, in some cases, the authentication server 106 may become unavailable. The AP 102 detects (at 310) that the authentication server 106 has become unavailable. In some cases, this can be based on the AP 102 failing to receive a response to a message sent by the AP 102 to the authentication server 106. For example, during an authentication procedure (e.g., an IEEE 802.1X authentication procedure) between the electronic device 104 and the authentication server 106, the AP 102 may forward a message of the authentication procedure received from the electronic device 104 to the authentication server 106. If the AP 102 does not receive a response to this message, the AP 102 can make a determination that the authentication server 106 is unavailable.

In other examples, the AP 102 can periodically send status requests to the authentication server 106 to check the authentication server's availability. If the authentication server 106 does not respond to a status request, the AP 102 can mark the authentication server 106 as unavailable.

In response to detecting that the authentication server 106 is unavailable after the electronic device 104 has started an authentication procedure, the AP 102 invokes (at 312) the authentication service 108 of the AP 102 to perform (at 314) the authentication procedure requested by the electronic device 104. As part of the authentication procedure, the AP 102 provides the server certificate 110 to the electronic device 104 for use by the electronic device 104 in verifying the identity of the AP 102. Assuming that the electronic device 104 has successfully authenticated the AP 102 based on the server certificate 110, the electronic device 104 and the authentication service 108 in the AP 102 can complete the authentication procedure. At that point, the electronic device 104 is able to access the network 103, even though the authentication server 106 is unavailable.

Similar processes can be performed for re-authentication of the electronic device 104.

By using a certificate enrollment server to provide server certificates to network devices (such as APs) and authentication servers, the risk of exposure of the server certificates is decreased due to use of secure connections between the certificate enrollment server and the network devices and authentication servers. Different network devices operated by different customers may receive different server certificates from the certificate enrollment server, so that even if a server certificate at a first network device that has been compromised is exposed, a server certificate at a second network device that has not been compromised can remain secure.

Use of the certificate enrollment server can simplify the process of providing server certificates to APs and authentication servers that can be used by clients to verify the trustworthiness of the APs and authentication servers.

As discussed in FIG. 2, the orchestration server 202 of the management system 230 can be used to launch certificate enrollment servers to service various customers. This allows the customers to make use of the management system 230 to deploy certificate enrollment servers, so that the customers do not have to deploy their own certificate enrollment servers. The management system 230 can be operated as a service by a service provider for use by different customers.

Additionally, the authentication servers can also be offered as a service by the service provider, so that the customers would not have to deploy their own authentication servers. This may reduce the costs associated with authentication server deployment.

In other examples, a customer may deploy their own proprietary authentication server. In such examples, the orchestration server 202 can provide, to the customer's authentication server, a certificate enrollment server URI identifying a certificate enrollment server to be used by the customer's authentication server. The orchestration server 202 may also provide a template defining the format of the certificate request to be used by the customer's authentication server when sending certificate requests.

Figure 4:
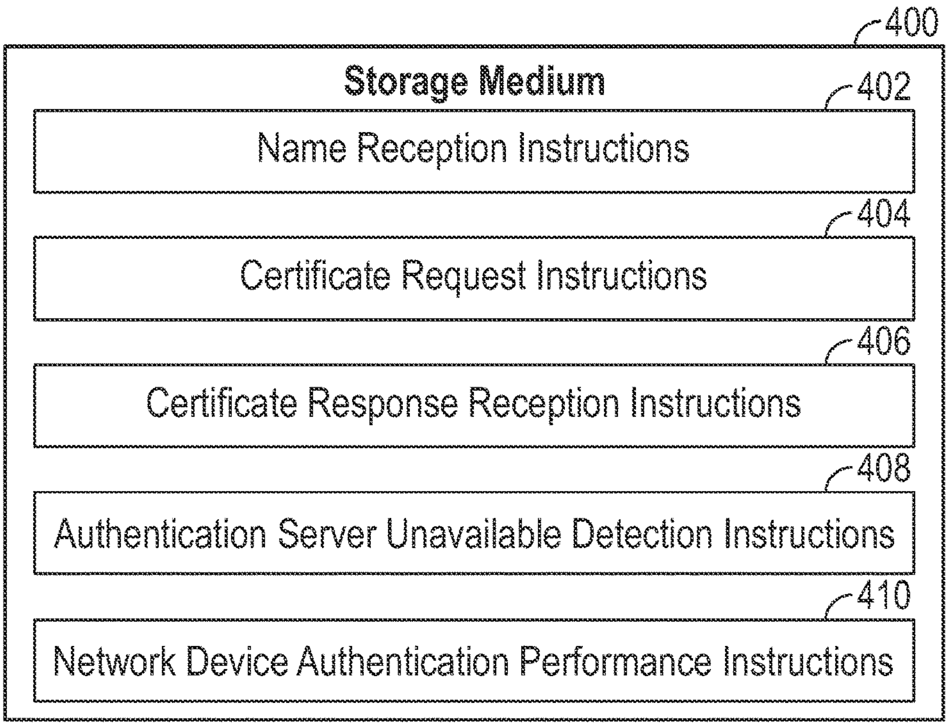
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a network device to perform various tasks. An example of the network device is an AP, such as the AP 102 of FIG. 1. In other examples, the network device can be a switch or another type of network device that an electronic device can connect to for accessing a network.

The machine-readable instructions include name reception instructions 402 to receive, at the network device from an orchestration server, a name for use in obtaining a certificate. An example of the orchestration server is the orchestration server 202 of FIG. 2. The name can include a CN (or alternatively, a collection of a CN and an SAN).

The machine-readable instructions include certificate request instructions 404 to send, from the network device to a certificate enrollment server, a certificate request including the name. An example of the certificate request is a CSR. An example of the certificate enrollment server is the certificate enrollment server 114 of FIG. 1.

The machine-readable instructions include certificate response reception instructions 406 to receive, at the network device from the certificate enrollment server, a response to the certificate request, where the response includes information of the certificate that is based on the name in the certificate request. For example, the information of the certification in the response can be a signed certificate, such as the signed server certificate 124 of FIG. 1.

The machine-readable instructions include authentication server unavailable detection instructions 408 to detect that an authentication server is unavailable for an authentication procedure for a client coupled to the network device. The detection of the unavailability of the authentication server can be performed during the authentication procedure or prior to the start of the authentication procedure.

The machine-readable instructions include network device authentication performance instructions 410 to, based on detecting that the authentication server is unavailable, use the certificate based on the name in the certificate request as part of the authentication procedure between the network device and the client. For example, the network device authentication performance instructions 410 can invoke an authentication service (e.g., 108 in FIG. 1) of the network device to perform the authentication procedure between the network device and the client.

In some examples, the certificate request sent from the network device is a first certificate request, and the name included in the first certificate request is the same as a name included in a second certificate request from the authentication server to the certificate enrollment server.

In some examples, the client is a first client. The machine-readable instructions are executable to further detect that a second client is coupled to the network device (e.g., the second client has performed wireless or wired communication with the network device), and based on detecting that the authentication server is available for an authentication procedure for the second client, the machine-readable instructions cause the network device to act as an intermediary for the authentication procedure for the second client that is performed between the second client and the authentication server. For example, in its role as an intermediary, the network device forwards authentication procedure messages from the client to the authentication server, and forwards authentication procedure messages from the authentication server to the client. In this scenario, the client is a supplicant of the authentication procedure, and the network device acts as an authenticator between the supplicant and the authentication server. In some examples, this intermediary is a RADIUS client (also referred to as a network access server or NAS) can act as a gateway between a client and a RADIUS server.

In some examples, the information of the certificate included in the response from the certificate enrollment server is a signed certificate signed by a CA (e.g., 122 in FIG. 1) associated with the certificate enrollment server. The machine-readable instructions cause the network device to derive the certificate from the signed certificate, such as by decrypting the signed certificate using a cryptographic key.

In some examples, the certificate enrollment server includes an EST server, where the network device and the authentication server are EST clients to obtain certificates from the EST server.

In some examples, in the authentication procedure, the machine-readable instructions cause the network device to send the certificate to the client for use by the client in verifying an identity of the network device based on the certificate.

In some examples, the machine-readable instructions cause the network device to receive, from the orchestration server, information of the certificate enrollment server, and access the certificate enrollment server using the received information.

In some examples, the received information of the certificate enrollment server includes a URI of the certificate enrollment server.

In some examples, the machine-readable instructions cause the network device to establish a secure connection between the network device and the certificate enrollment server accessible at the URI, and send the certificate request comprising the name from the network device to the certificate enrollment server over the secure connection.

In some examples, the certificate enrollment server was selected by the orchestration server from among a plurality of certificate enrollment servers based on a location of the network device.

In some examples, the network device is a first network device, and the certificate is a first certificate, where the first certificate is different from a second certificate for a second network device that obtained information of the second certificate from the certificate enrollment server or another certificate enrollment server.

Figure 5:
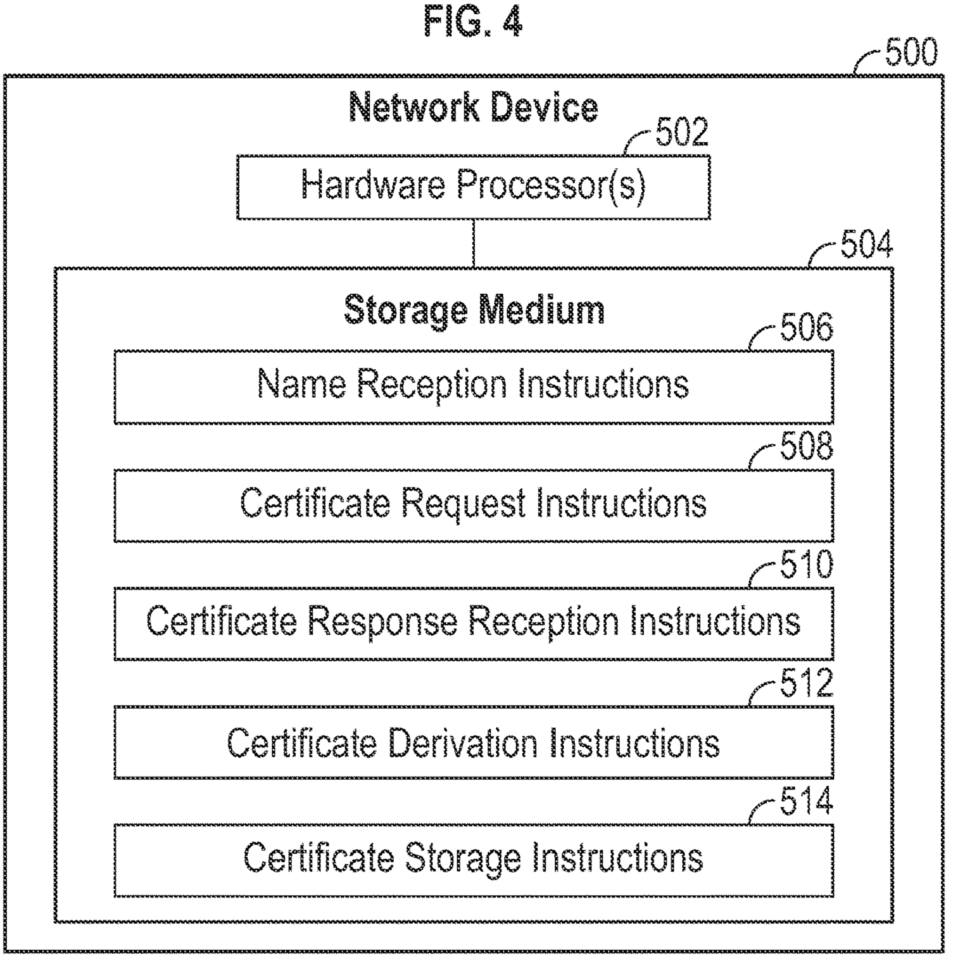
FIG. 5 is a block diagram of a network device according to some examples.

FIG. 5 is a block diagram of a network device 500 according to some examples of the present disclosure. The network device 500 can be an AP or another type of network device.

The network device 500 includes one or more hardware processors 502. A hardware processor can include a microprocessor, a core of a multi-core microprocessor, a microcontroller, a programmable integrated circuit, a programmable gate array, or another hardware processing circuit.

The network device 500 includes a non-transitory storage medium 504 storing machine-readable instructions executable on a hardware processor 502 to perform various tasks. Machine-readable instructions executable on a hardware processor can refer to the instructions executable on a single hardware processor or the instructions executable on multiple hardware processors.

The machine-readable instructions in the storage medium 504 include name reception instructions 506 to receive, at the network device 500 from an orchestration server, a name for use in obtaining a first certificate of the network device. The name received from the orchestration server is a same name as used by an authentication server to obtain a second certificate of the authentication server.

The machine-readable instructions in the storage medium 504 include certificate request instructions 508 to send, from the network device to a certificate enrollment server, a certificate request including the name. The certificate request can further include other parameters provided by the orchestration server to the network device.

The machine-readable instructions in the storage medium 504 include certificate response reception instructions 510 to receive, at the network device from the certificate enrollment server, a response to the certificate request, where the response includes information of the first certificate that is based on the name in the certificate request. The information of the first certificate can include a signed certificate, for example.

The machine-readable instructions in the storage medium 504 include certificate derivation instructions 512 to derive the first certificate from the information of the first certificate. For example, the certificate derivation instructions 512 can decrypt the signed certificate to obtain the first certificate (unsigned version of the first certificate).

The machine-readable instructions in the storage medium 504 include certificate storage instructions 514 to store the first certificate in a memory of the network device for use in an authentication procedure performed by the network device responsive to the authentication server being unavailable.

Figure 6:
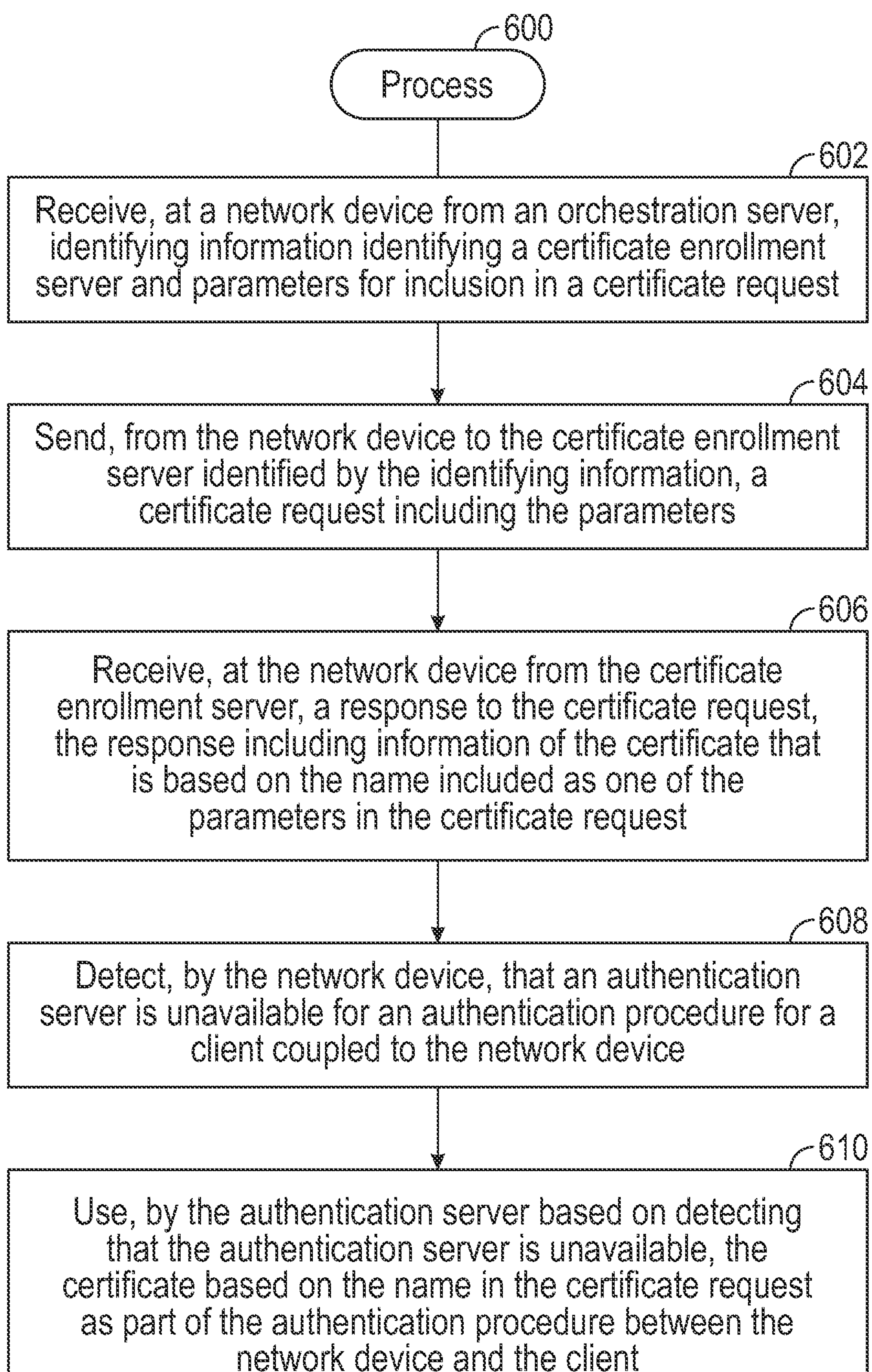
FIG. 6 is a flow diagram of a process according to some examples.

FIG. 6 is a flow diagram of a process 600 according to some examples. The process 600 can be performed by a network device, such as an AP or another type of network device.

The process 600 includes receiving (at 602), at a network device from an orchestration server, identifying information identifying a certificate enrollment server and parameters for inclusion in a certificate request. The parameters include a name for use in obtaining a certificate, as well as other parameters as discussed further above. The identifying information can include a URI of the certificate enrollment server.

The process 600 includes sending (at 604), from the network device to the certificate enrollment server identified by the identifying information, a certificate request including the parameters. An example of the certificate request is the certificate request 120 of FIG. 1.

The process 600 includes receiving (at 606), at the network device from the certificate enrollment server, a response to the certificate request, the response including information of the certificate that is based on the name included as one of the parameters in the certificate request.

The process 600 includes detecting (at 608), by the network device, that an authentication server is unavailable for an authentication procedure for a client coupled to the network device. The process 600 includes, using (at 610), by the authentication server based on detecting that the authentication server is unavailable, the certificate based on the name in the certificate request as part of the authentication procedure between the network device and the client. The authentication procedure between the network device and the client is performed by an authentication service in the network device invoked for authentication survivability responsive to the authentication server being unavailable.

A storage medium (e.g., 400 in FIG. 4 or 504 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a network device to:

receive, at the network device from an orchestration server, a name for use in obtaining a certificate, the network device to establish connectivity with electronic devices seeking access to a network;

send, from the network device to a certificate enrollment server, a certificate request comprising the name;

receive, at the network device from the certificate enrollment server, a response to the certificate request, the response comprising a signed certificate signed by a certificate authority (CA) associated with the certificate enrollment server, the signed certificate produced from the certificate that is based on the name in the certificate request;

derive the certificate from the signed certificate;

receive, at the network device, a message that is part of an authentication procedure between a first electronic device connected to the network device and an authentication server, the network device to forward the message to the authentication server if the authentication server is available;

detect that the authentication server is unavailable for the authentication procedure between the first electronic device and the authentication server;

based on detecting that the authentication server is unavailable, use the certificate based on the name in the certificate request as part of the authentication procedure between the network device and the first electronic device; and after performing the authentication procedure, communicate data of the first electronic device through the network device.

2. The non-transitory machine-readable storage medium of claim 1, wherein the certificate request sent from the network device is a first certificate request, and wherein the name included in the first certificate request is the same as a name included in a second certificate request from the authentication server to the certificate enrollment server.

3. The non-transitory machine-readable storage medium of claim 1, wherein the instructions upon execution cause the network device to:

detect that a second electronic device is connected to the network device; and based on detecting that the authentication server is available for an authentication procedure for the second electronic device, act as an intermediary for the authentication procedure for the second electronic device that is performed between the second electronic device and the authentication server.

4. The non-transitory machine-readable storage medium of claim 3, wherein the authentication procedure for the second electronic device that is performed between the second electronic device and the authentication server comprises the authentication server sending, to the second electronic device, a certificate obtained by the authentication server from the certificate enrollment server based on a certificate request comprising the name sent from the authentication server to the certificate enrollment server.

5. The non-transitory machine-readable storage medium of claim 1, wherein the certificate enrollment server comprises an Enrollment over Secure Transport protocol (EST) server.

6. The non-transitory machine-readable storage medium of claim 5, wherein the network device and the authentication server are EST clients to obtain certificates from the EST server.

7. The non-transitory machine-readable storage medium of claim 1, wherein the instructions upon execution cause the network device to:

in the authentication procedure, send, from the network device, the certificate to the first electronic device for use by the first electronic device in verifying an identity of the network device based on the certificate.

8. The non-transitory machine-readable storage medium of claim 1, wherein the instructions upon execution cause the network device to:

receive, from the orchestration server, information of the certificate enrollment server; and access the certificate enrollment server using the received information.

9. The non-transitory machine-readable storage medium of claim 8, wherein the received information of the certificate enrollment server comprises a uniform resource identifier (URI) of the certificate enrollment server.

10. The non-transitory machine-readable storage medium of claim 9, wherein the instructions upon execution cause the network device to:

establish a secure connection between the network device and the certificate enrollment server accessible at the URI; and send the certificate request comprising the name from the network device to the certificate enrollment server over the secure connection.

11. The non-transitory machine-readable storage medium of claim 8, wherein the certificate enrollment server was selected by the orchestration server from among a plurality of certificate enrollment servers based on a location of the network device.

12. The non-transitory machine-readable storage medium of claim 1, wherein the name comprises a common name (CN) of a domain of a network provider of the network device.

13. The non-transitory machine-readable storage medium of claim 1, wherein the name comprises a common name (CN) and a Subject Alternative Name (SAN) of domains of a network provider of the network device.

14. The non-transitory machine-readable storage medium of claim 1, wherein the instructions upon execution cause the network device to take over providing an authentication service for electronic devices based on detecting that the authentication server is unavailable.

15. A network device comprising:

a hardware processor; and a non-transitory storage medium storing instructions executable on the hardware processor to:

receive, at the network device from an orchestration server, a name of a network provider that operates the network device, the name of the network provider for use in obtaining a first certificate of the network device, the name of the network provider received from the orchestration server being a same name as used by an authentication server to obtain a second certificate of the authentication server;

send, from the network device to a certificate enrollment server, a certificate request comprising the name of the network provider;

receive, at the network device from the certificate enrollment server, a response to the certificate request, the response comprising a signed certificate signed by a certificate authority (CA) associated with the certificate enrollment server, the signed certificate produced from the first certificate that is based on the name of the network provider in the certificate request;

derive the first certificate from the signed certificate;

receive, at the network device, a message that is part of an authentication procedure between an electronic device connected to the network device and the authentication server, the network device to forward the message to the authentication server if the authentication server is available;

detect that the authentication server is unavailable for the authentication procedure between the electronic device and the authentication server;

based on detecting that the authentication server is unavailable, use the first certificate based on the name in the certificate request as part of the authentication procedure between the network device and the electronic device; and after performing the authentication procedure, communicate data of the electronic device through the network device.

16. The network device of claim 15, wherein the name comprises a common name (CN) of a domain of the network provider of the network device.

17. A method comprising:

receiving, at a network device from an orchestration server, identifying information identifying a certificate enrollment server and parameters for inclusion in a certificate request, the parameters comprising a name for use in obtaining a certificate, the network device to establish connectivity with electronic devices seeking access to a network;

sending, from the network device to the certificate enrollment server identified by the identifying information, a certificate request comprising the parameters;

receiving, at the network device from the certificate enrollment server, a response to the certificate request, the response comprising a signed certificate signed by a certificate authority (CA) associated with the certificate enrollment server, the signed certificate produced from the certificate that is based on the name included as one of the parameters in the certificate request;

deriving, by the network device, the certificate from the signed certificate;

receiving, at the network device, a message that is part of an authentication procedure between an electronic device connected to the network device and an authentication server, the network device to forward the message to the authentication server if the authentication server is available;

detecting, by the network device, that the authentication server is unavailable for the authentication procedure between the electronic device and the authentication server;

based on detecting that the authentication server is unavailable, using, by the network device, the certificate based on the name in the certificate request as part of the authentication procedure between the network device and the electronic device; and after performing the authentication procedure, communicating data of the electronic device through the network device.

18. The method of claim 17, wherein the authentication procedure between the network device and the electronic device is performed by an authentication service in the network device invoked for authentication survivability responsive to the authentication server being unavailable.

* * * * *